Patented Feb. 23, 1943

2,311,898

UNITED STATES PATENT OFFICE 2,311,898

AROMATIC ACYLOXY ALIPHATIC NITRILES

Joy G. Lichty, Stow, Ohio, assignor to Wingfoot Corporation, Wilmington, Del., a corporation of Delaware No Drawing. Application May 24, 1941,
Serial No. 395,067

10 Claims. (Cl. 260—465)

This invention relates to certain compounds intended for use as intermediates in the synthesis of other organic compounds. More particularly, it relates to substituted nitriles which may be used to produce monomeric substances employable in the manufacture of polymerized materials.

Acrylonitrile and similar nitriles have been employed in polymerizations leading to the preparation of synthetic rubber and other plastics. One method of preparing unsaturated nitriles, such as the aforementioned acrylonitrile, is to remove a molecule of a carboxylic acid from a saturated nitrile containing an acyl substituent. Thus, acetic acid may be removed from alpha acetoxy, alpha methyl propionitrile to leave methacrylonitrile, a useful monomer. The reaction involved proceeds as follows:

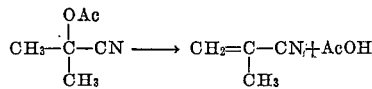

Other unsaturated nitriles could be prepared if there were available the acylated saturated nitriles from which a molecule of carboxylic acid could be removed. It is an object of this invention to provide such intermediates, which may be employed to produce desired unsaturated nitriles or which may be used for other purposes.

The class of compounds which constitutes the invention may be termed the alpha aromatic, alpha acyloxy aliphatic nitriles, particularly those in which the acyloxy group is an acetic acid residue and of which the alpha aryl-substituted compounds are especially desirable. The class is illustrated by the compound alpha phenyl alpha acetoxy propionitrile,

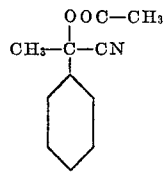

This last mentioned compound may be prepared in the following manner: Hydrogen cyanide was bubbled into 120 grams of acetophenone containing a small amount of sodium cyanide (1 gram) until the increase in weight was 28 grams. The acetophenone was maintained at room temperature or lower during the addition of the gas and the solution was then allowed to stand until the reaction was complete. The resulting cyanohydrin was acetylated by adding it in small amounts to 110 grams of acetic anhydride containing 1 cc. of concentrated $H_2SO_4$. Acetylation was conducted at a temperature between 80–100° C., this temperature being maintained for one hour after all of the cyanohydrin had been added. Distillation of the acetylated compound yielded 77.4 grams of a liquid boiling at 112–128° C./2 mm. % N found, 7.49, 7.53; Calculated for $C_{11}H_{11}O_2N$, 7.42. The reactions involved are represented by the following equations:

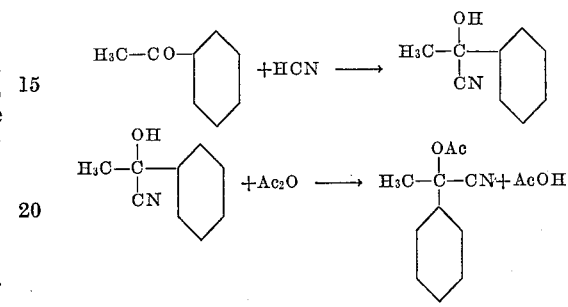

In a similar manner to the foregoing there may be prepared other alpha aromatic, alpha acyloxy aliphatic nitriles, the appropriate alkyl aryl ketone being treated with hydrogen cyanide to form the cyanohydrin and this being then treated with the anhydride, acid halide or ketene corresponding to the acyloxy group which it is desired to introduce. By the method illustrated or by equivalent procedure there may be produced the cyanohydrins of the following ketones: acetophenone, propiophenone, butyrophenone, tertiary butyl phenyl ketone, isoamyl phenyl ketone, diethyl acetophenone, ethyl dimethyl acetophenone, tolyl methyl ketone, tolyl ethyl ketone, xylyl methyl ketone, naphthyl methyl ketone, and other ketones containing an aromatic group and an aliphatic group.

The cyanhydrins thus obtained may be reacted with the anhydrides or the acid halides, corresponding to the following acids: acetic acid, propionic acid, butyric acid, benzoic acid, toluic acids, naphthoic acids, and the like.

Some of the compounds which can be thus prepared and come within the scope of the invention are: alpha phenyl, alpha propoxy propionitrile; alpha phenyl, alpha butoxy propionitrile; alpha phenyl, alpha benzoxy propionitrile; alpha tolyl, alpha acetoxy propionitrile; alpha tolyl, alpha propoxy propionitrile; alpha naphthyl, alpha acetoxy propionitrile; alpha phenyl, alpha acetoxy butyronitrile; alpha tolyl, alpha acetoxy butyronitrile; etc.

While there have been described above certain preferred embodiments of the invention and a method of preparing the same, it will be apparent that the class of compounds includes other species not particularly mentioned and, also, that the method of preparation may be varied in numerous respects or the compounds may be prepared by other means than those described; all without departing from the spirit of the invention or from the scope of the appended claims.

I claim:

1. The alpha aromatic, alpha acyloxy aliphatic nitriles.
2. The alpha aryl, alpha acyloxy aliphatic nitriles.
3. The alpha aryl, alpha aliphatic acyloxy aliphatic nitriles.
4. The alpha aryl, alpha acetoxy aliphatic nitriles.
5. The alpha phenyl, alpha acetoxy aliphatic nitriles.
6. The alpha naphthyl, alpha acetoxy aliphatic nitriles.
7. The alpha aryl, alpha acetoxy propionitriles.
8. Alpha phenyl, alpha acetoxy propionitrile.
9. Alpha tolyl, alpha acetoxy propionitrile.
10. Alpha naphthyl, alpha acetoxy propionitrile.

JOY G. LICHTY.